United States Patent [19]

Granzow et al.

[11] 3,845,239

[45] Oct. 29, 1974

[54] COMBINED FACSIMILE RECEIVING AND SENDING UNIT

[75] Inventors: Daniel B. Granzow, Arlington Heights; William R. Maloney, Deerfield; William B. Miles, Arlington Heights, all of Ill.

[73] Assignee: Addressograph-Multigraph Corporation, Mount Prospect, Ill.

[22] Filed: June 16, 1969

[21] Appl. No.: 833,309

[52] U.S. Cl. .......... 178/6, 178/7.6

[51] Int. Cl. .......... H04n 1/02, H04n 1/04

[58] Field of Search .......... 178/7.6, 7.1, 6.6, 7.1 C, 178/6 LC, DIG. 2, 6; 179/4, 2 TV; 271/46, 47, 51, 57, 62, 78; 350/96 B

[56] References Cited

UNITED STATES PATENTS

| | | | |
|---|---|---|---|
| 1,863,363 | 6/1932 | Zworykin | 178/7.6 |
| 2,537,173 | 1/1951 | Szegho | 179/2 TV |
| 3,240,106 | 3/1966 | Hicks | 178/6 LC |
| 3,263,027 | 7/1966 | Beltrami | 178/6.8 |
| 3,317,738 | 5/1967 | Piepenbrink | 178/6 LC |
| 3,426,144 | 2/1969 | Roth | 178/7.6 |
| 3,436,474 | 4/1969 | Saeger et al. | 178/DIG. 3 |
| 3,467,774 | 9/1969 | Bryant | 350/96 B |
| 3,470,319 | 9/1969 | McGlamery | 178/6 LC |
| 3,535,439 | 10/1970 | Matthews | 178/7.6 |
| 3,554,721 | 1/1971 | Gardner | 350/96 B |
| 3,581,000 | 5/1971 | Hansen | 178/6 |
| 3,588,335 | 6/1971 | Harris et al. | 178/7.6 |

*Primary Examiner*—Howard W. Britton
*Assistant Examiner*—Joseph A. Orsins, Jr.
*Attorney, Agent, or Firm*—Sol L. Goldstein; Harry M. Fleck

[57] ABSTRACT

A transceiver device operable to a transmitting mode for sending to a remote receiver data signals corresponding to information recorded on a document and to a receiving mode for receiving data signals from a remote source, converting the signals into visible information and producing a hard copy thereof. A preferred embodiment of the transceiver device uses a unique light collecting tube for receiving light reflected from a pattern of information on an original document and to convey the light to a photosensitive device which converts the light into transmittable data signals. The efficiency of the light collecting tube permits the use of the relatively low light output scanning beam of a cathode ray tube for illuminating the original document in the transmitting mode. The same cathode ray tube is used for imaging a copy sheet in the receiving mode.

17 Claims, 10 Drawing Figures

COMBINED FACSIMILE RECEIVING AND SENDING UNIT

BACKGROUND OF THE INVENTION

This invention relates generally to data transmitting and receiving apparatus and more particularly to a device for transmitting information to a remote source as well as for receiving information from a remote source and providing a hard copy thereof.

Devices are known today which are capable of converting information printed on a document, into video signals which are transmitted via existing communications lines to a remote station whereat the video signal is converted back into readable data from which a hard copy is made.

In order to carry out the above-described process, equipment at the sending end of the system must be provided which is able to "read" the data containing document and to convert the printed information into signals which may be transmitted over communication lines.

Various types of scanning apparatus or devices are being used for the above purpose. Some of the devices "read" an entire page of data, while others scan a single line of data at a time. In most cases, however, the devices are complex, require high intensity light sources for the illumination of the document and are costly.

Transmitting and receiving apparatus of the type heretofore described which are capable of transmitting and receiving signals, hereinafter referred to as "transceivers," often are called upon to perform one function while in the process of performing the other. An attempt to do so could cause the loss of valuable data due to disruption of the particular function being performed at that time if measures are not taken to prevent such an occurrence.

SUMMARY OF THE INVENTION

Accordingly, it is a general object of the present invention to provide a new and improved transceiver device capable of both scanning a document and converting the information thereon into transmittable video signals and transmitting the signals to a remote source, as well as receiving video signals, converting the signals into "readable" data and transforming the data into hard copies.

It is a more specific object of the present invention to provide a transceiver device of the last-mentioned type including novel circuitry for preventing the disruption of the mode of operation of the transceiver while functioning to transmit or receive data, as the case may be, thereby to prevent a loss of information.

It is still another object of the present invention to provide in apparatus of the above-described type, new and improved scanning means which overcomes the drawbacks of the scanning devices of the prior art.

It is a further object of this invention to provide a simply constructed, relatively inexpensive line scanner device for use in accumulating and converting data from an original document into transmittable video signals.

It is yet another object of the present invention to provide a new and improved transceiver including document scanning apparatus of the type heretofore described which is capable of efficiently scanning and converting a line of data from a graphic original into transmittable video signals using the illumination of an electromagnetic radiation source, such as, for example, a relatively low light output cathode ray tube located a predetermined distance therefrom, and wherein the electromagnetic radiation source can also be used in the receiving mode to receive signals, convert the signals to visible data, and expose a copy sheet to the data as the copy sheet moves past the source.

Briefly, a transceiver according to the instant invention includes novel scanning means for "reading" a document and converting the information therefrom into transmittable video signals. In one embodiment, a unique light collecting or integrating tube is provided which receives light emitted from a cathode ray tube (CRT) used in the transceiver. The light from the cathode ray tube is sufficient to illuminate the document moved along a path transverse to an axially extending slit formed in the wall of the tube. Light is reflected from the document back through the slit into the tube. The inside surface of the tube, being highly reflective or coated with a phosphor, carries the light to a photosensitive device or devices located within the tube. The photosensitive device converts the reflected light into video signals which are transmitted to a remote receiving station. In another embodiment, a fiber bundle is used to carry light to the document, and light reflected from the face of the document to the interior of the tube. In still another embodiment, a specially arranged fiber bundle arrangement is used which gathers light and carries the light rays directly from the CRT to the document and back to the photomultiplier.

The transceiver according to the invention includes also novel circuitry for controlling the operation thereof. The circuitry monitors the functioning of the transceiver and prevents it from performing the receive function while transmitting information, and transmitting data while in the process of receiving information and providing a hard copy thereof.

DESCRIPTION OF THE DRAWINGS

A better understanding of the present invention and its organization and construction may be had by referring to the description below in conjunction with the accompanying drawings, wherein.

DETAILED DESCRIPTION

Figure 1:
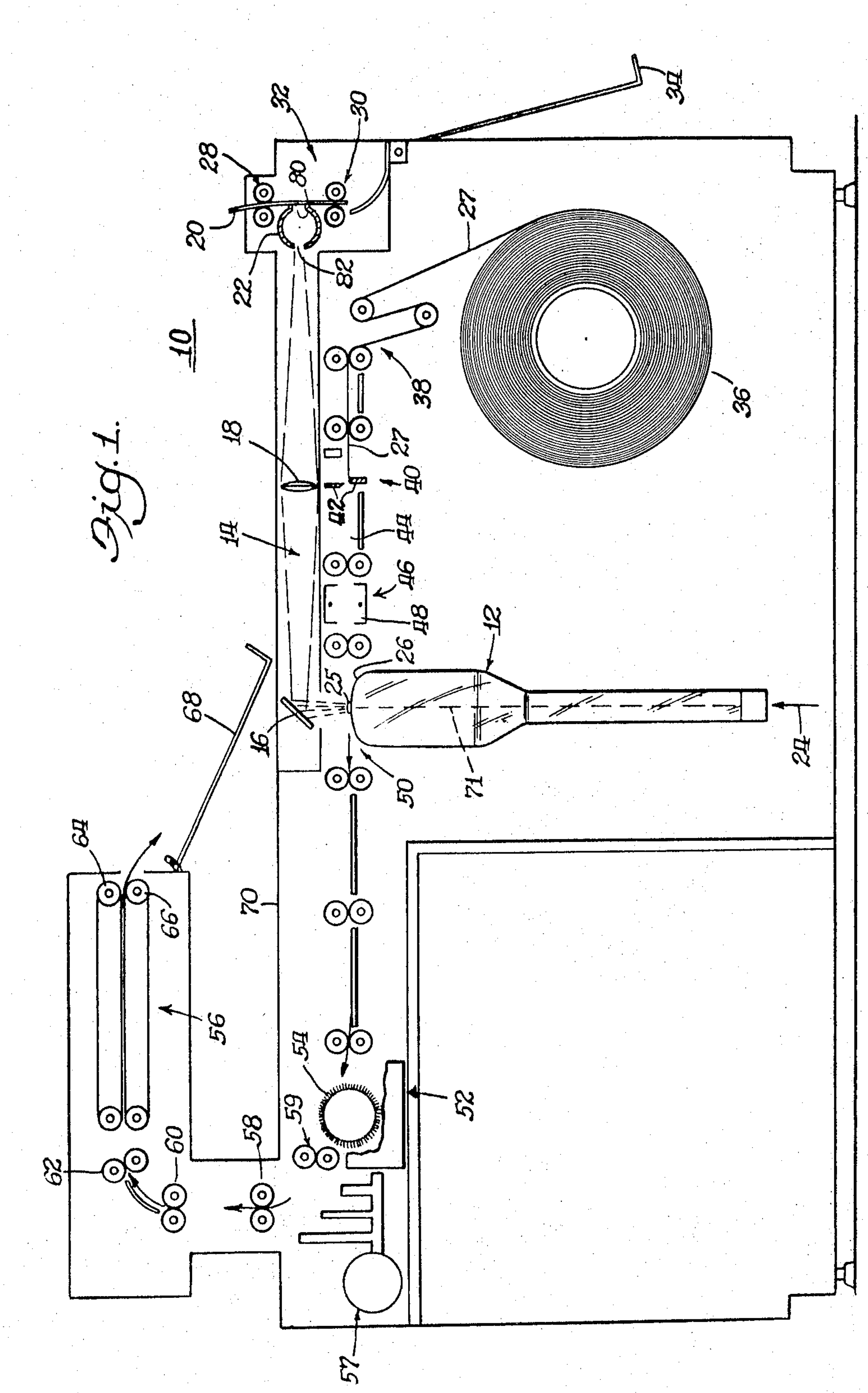
FIG. 1 is a side, diagrammatical view of a transceiver according to the invention.

Referring now to the drawings in more detail, FIG. 1 thereof illustrates a transceiver 10 according to the invention. The transceiver includes an electromagnetic radiation source, preferably taking the form of a cathode ray tube 12 (CRT) which, in the transmitting mode, provides a scanning light beam via optical system 14, including inclined reflector 16 and lens 18, to illuminate a document 20 being fed into the transceiver. The information from document 20 is, through scanning device or light collecting tube 22, then changed into transmittable signals which are sent via an existing communications line to a remote receiver station (not shown). The CRT, in the receiving mode, accepts data signals from a remote source (not shown) at the input 24, and converts the signals to a visible light image or pattern of light and shadow along a narrow strip 25 on the face 26 of the CRT tube 12 to expose copy material 27 being fed through the transceiver, whereby a hard copy of the information is provided. The operation of the transceiver in both the transmitting and receiving modes will be described in greater detail hereinafter.

While a cathode ray tube of the type disclosed and described in the instant case is a preferred electromagnetic radiation source for use in the transceiver device according to the invention, it is to be understood that other electromagnetic radiation sources, such as, for example, a scanning laser beam or modulating light source, may also be used in the dual, transmitting-receiving capacity. Still another electromagnetic radiation source which could be used in place of the CRT 12 is a gas plasma panel which essentially comprises a pair of glass plates, one having a set of horizontal conductive strips and the other one having a set of vertical conductive strips disposed thereon, sandwiched together to form a matrix with a third, apertured plate therebetween. The apertures in the center plate are filled with gas so that by providing a current through certain ones of the conductive strips a gaseous flow or discharge can be given off at selected locations thereby producing intelligent information. An example of such a panel is shown in U.S. Pat. No. 2,933,648.

The transceiver, as shown in FIG. 1, includes two sets of roller members 28, 30 for transporting an original data bearing document 20 through the scanning section 32 of the transceiver and thence to the exterior thereof, where the document is received in a tray 34. The transceiver further includes a roll 36 of copy material 27, such as, for example, zinc oxide coated paper. The roll of paper is fed via roller arrangement 38 past a cutting station 40 including cutting blades 42 for severing a selected length of copy material from the roll. In addition to the cutting station 40, there is included along the copy paper path 44 of the transceiver, the usual charging station 46, including a corona electrode 48 of the well-known type, followed by an exposure station 50, including cathode ray tube 12, a developer station 52, including a magnetic brush developer 54 and a fusing station 56 for fixing toner powder applied to the copy material at developer station 52 to the copy paper. Interposed along the copy paper path between the fuser 56 and the developing station 52 is a paper turn around blower 57 used to deflect the copy paper to the vertical path as it leaves roller pair 59. The blower causes the copy sheet to be guided upwardly into a plurality of roller sets 58, 60 and 62 into the fusing station 56 from which, by means of belts 64, 66 the completed copy is transported out of the transceiver into a catch tray 68 positioned along the upper or top wall 70 thereof.

Figures 2, 3, 4:
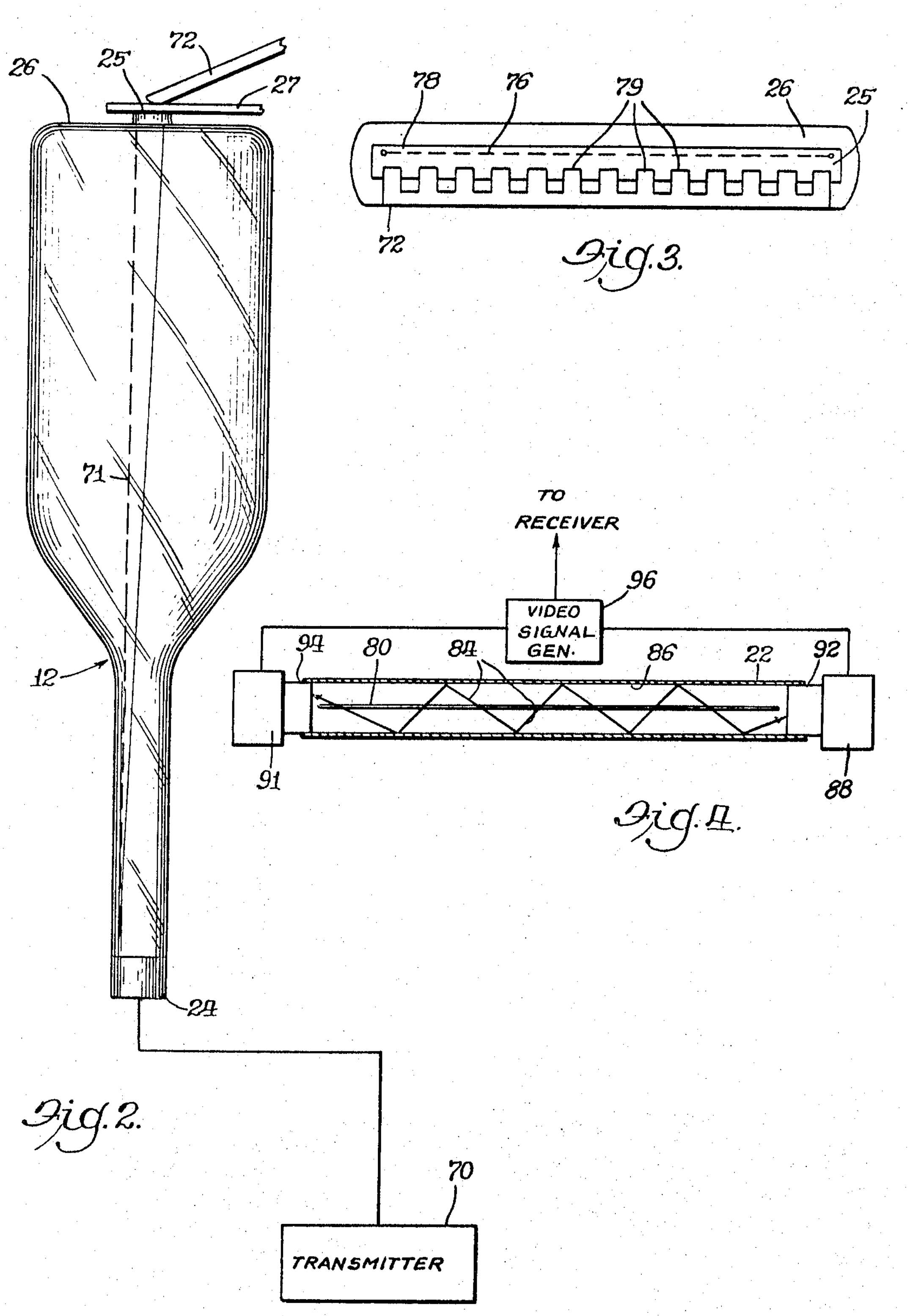
FIG. 2 is an enlarged view of the cathode ray tube of the transceiver of FIG. 1.
FIG. 3 is an enlarged plan view of a portion of the face of the cathode ray tube of FIG. 2 illustrating in greater detail the hold down means provided to hold a copy sheet in direct contact with the face of the cathode ray tube as the copy sheet passes thereover to be imaged.
FIG. 4 is an axial sectioned view of a line scanning device for converting data from an original document into transmittable video signals, according to the invention.

Referring now to FIG. 2, there is shown in an enlarged view, the cathode ray tube (CRT) 12 producing a scanning electron beam 71 which traverses strip 25 on the face of the tube. As is shown, data signals from a remote sending source 70, shown in block diagram form and designated "transmitter," are received at the input 24 of CRT 12 and are converted thereby in a well-known manner, into a visible pattern of light and shadow which is shown across a narrow raised, fiber optic bundle strip 25, formed integrally with and along a diameter of face 26 of tube 12. Photosensitive copy material 27 being fed across the face of tube 12 is thereby imaged with the visible information to provide a hard copy thereof. The copy material 27 is imaged line-by-line as it passes across the face 26 of the CRT. A hold down finger member 72 is provided over the tube face at an angle thereto, to maintain the copy material 27 in direct contact with the integral fiber optic strip 25 so as to provide the best possible imaging of the copy material.

In FIG. 3 there is illustrated in greater detail the hold down finger member 72 located above the raised fiber optic strip 25 of the tube face 26. The width of the strip 25 of tube 12 is about one-half inch, and the scan line, designated 76, created by the scanning electron beam 71 which moves in one direction across the tube strip while imaging a copy sheet passing thereover, is positioned near edge 78 of the strip. The fingers 79 of the hold down member do not interfere with the scan line 76 since they are offset with respect thereto, as shown.

Figure 5:
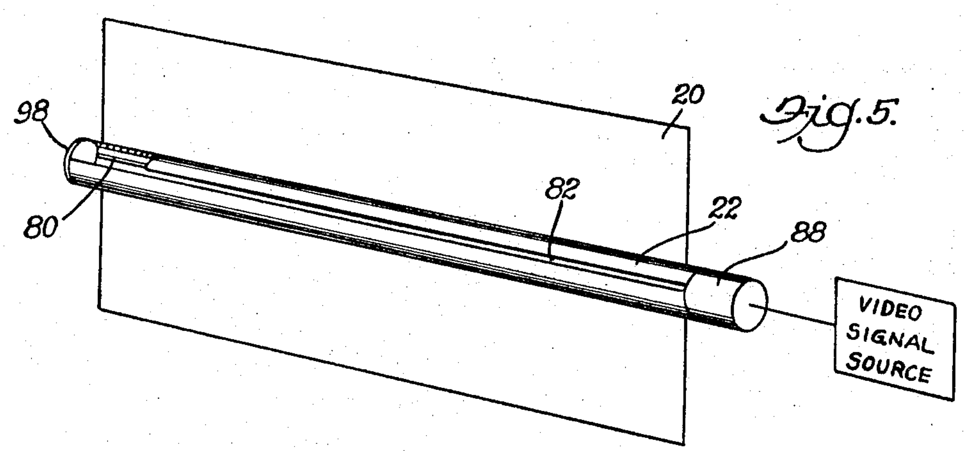
FIG. 5 is a perspective view of an alternative embodiment of a line scanning device according to the invention.

Looking now at FIGS. 4 and 5 there are shown the preferred embodiments of a scanning device or light collecting or integrating tube 22 according to the invention.

The light tube has a cylindrical shape with a first narrow, elongated slit 80 extending axially along the wall thereof. At a position located 180° from the slit 80 about the circumference of the cylinder, there is provided a second slit 82, seen in FIG. 5. As shown in FIG. 1, during the transmission of data signals light from CRT 12 is passed via optical assembly 14, and enters the cylinder 22 through slit 82. The light passes directly through the interior of the light tube 22, emerges therefrom through the opposite slit 80 and impinges on the moving document 20. Light is reflected from the face of the document back through slit 80 and collected in the tube 22. The inner surface 86 of the tube being highly polished, (preferably silvered as in the case of a mirror), or phosphor covered, reflects the collected light rays 84 randomly back and forth along the tube interior toward the ends thereof to photosensitive devices, such as, for example, phototransistors, photocells or the like, but preferably photomultipliers 88, 90 (FIG. 4) mounted in the open ends 92, 94, respectively, of the tube 22. The photomultipliers convert the light signals or rays in the usual manner into signals which are amplified and transmitted by the video signal generator 96 to receiving apparatus, which could take the form of a transceiver like the one of the instant invention.

Adequate illumination of the document from the relatively low power light beam of a cathode ray tube, such as CRT 12, or the like illuminating source, is possible because of the efficient light collecting qualities of tube 22. Because virtually no light is lost in the tube 22, a maximum quantity of light is carried from the document surface to the photomultipliers whereat the light striking the last-mentioned elements, is converted to transmittable video signals.

It should be noted that the illuminating electron beam 71 produced by the electron gun of CRT 12 scans across raised strip 25 only in one direction. Consequently, the light beam created in the usual manner by the action of the electrons impinging on the phosphor coated face of the tube, begins to scan the original document through slits 82 and 80 near a first photomultiplier 90 and moves away from the last-mentioned photomultiplier toward the photomultiplier 88 mounted at the other end of the tube 22. During the course of scanning, the signals created by the light being reflected from the document to the photomultipliers decrease in amplitude as the beam moves away from the photomultiplier 90 and then increase as the beam scans toward photomultiplier 88. To compensate for the change in amplitude of the signals, a gain control is incorporated in the video signal generator 96. Thus, the signals transmitted from a transceiver in the transmitting mode are of equal amplitude when transmitted from video signal generator 96 to the remote receiving station.

In the case of the light tube 22 of FIG. 5, only one photomultiplier 88 is used at one end of the tube. Instead of a second photomultiplier at the other end of the tube, there is provided a mirror 98. Mirror 98 serves to reflect light rays back to the photomultiplier for conversion to video signals. It has been found, however, that the use of two photomultipliers provides stronger video signals to the remote receiving station than does the single photomultiplier and mirror combination.

Again, a gain control must likewise be used in conjunction with the light tube 22 employing only a single photomultiplier and mirror 98, since the signals generated by photomultiplier 88 likewise will be of variable amplitude, depending upon the distance from the mirror and photomultiplier of the scanning beam from CRT 12.

Figure 6:
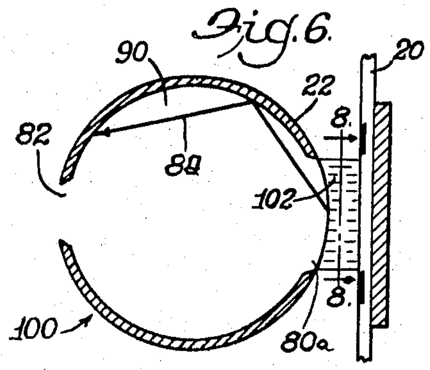
FIG. 6 is an end sectional view of an arrangement of the combination of a scanning device or light tube which employs fiber optics in the scanning of a document, according to the invention.

FIG. 6 discloses an alternative embodiment of a scanning device 100 according to the invention. This embodiment combines the light tube 22 of FIGS. 4 and 5 with a fiber optic bundle 102. The fiber bundle is positioned between an enlarged or widened slit 80*a*, adjacent document 20 and the document itself, for the purpose of concentrating light from cathode ray tube 12 onto the document 20 and carrying light reflected from the document into the tube interior to be reflected, as in the case of rays 84, to the photomultiplier 88, 90 at the opposite ends thereof. The slit 80*a* is widened to accommodate the width of the fiber optic bundle 102.

The fiber optic bundle 102 serves as does the slit 80 of the light tube 22 of FIGS. 4 and 5, to pass light from the scanning beam of CRT 12 to the document and pass reflected light from the document to the interior of the tube 22.

Figure 8:
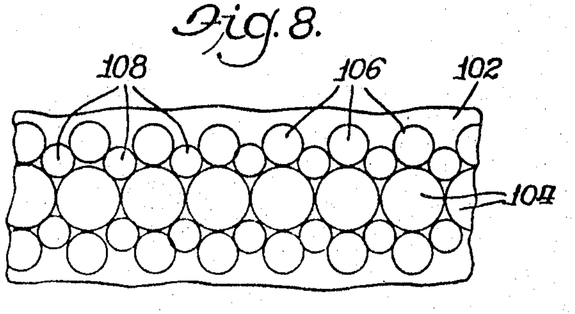
FIG. 8 is an enlarged cross sectional view of the fiber bundle of FIG. 6 taken along the line 8—8.

A cross section of the fiber bundle 102 as shown in FIG. 8 reveals that the fibers 104 carrying the light from CRT 12 to the document 20 are coherent and relatively large in diameter, and that the fibers 106, 108 carrying light reflected from the document into the interior of the tube are non-coherent and of smaller, random diameters. In this manner light is directed efficiently and uniformly to the document, and from the surface thereof, into tube 22.

Figure 7:
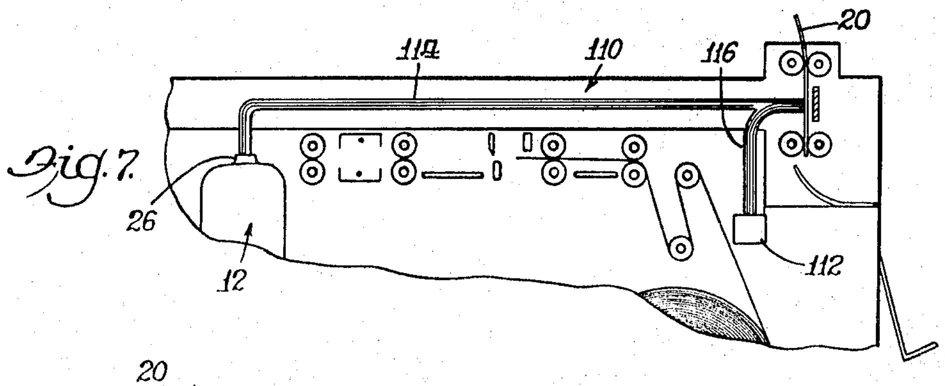
FIG. 7 is a sectioned diagrammatic view of a transceiver using a fiber optical arrangement for scanning a document according to the invention.

A third alternative embodiment 110 of a document illuminating arrangement is provided in FIG. 7 of the drawings. In this case, fiber optic bundles are used exclusively for carrying and directing the light beam of the illuminating source, CRT 12, to the document 20, and from there to a photosensitive device 112. A first coherent fiber bundle 114 comprising fibers similar to those (104) of FIG. 2 is used to transmit light from the face 26 of CRT 12 to the document much as in the case of the optical system of FIG. 1. The fiber bundle 114 is joined near the vicinity of document 20, to a second fiber bundle 116 which carries light reflected from the document 20, to photomultiplier 112. The fibers of the second bundle can be of lesser diameter and non-coherent like fibers 106, 108 of FIG. 8. The fiber bundle serves as does the light tube 22, to collect a maximum amount of light for the purpose of illuminating the document.

Figure 9:
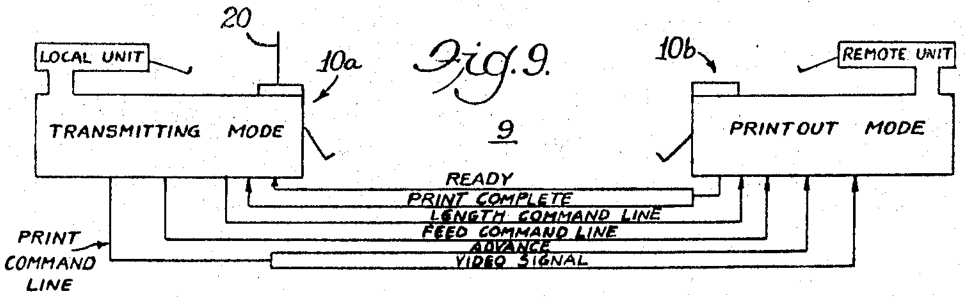
FIG. 9 is a block diagram of circuitry in the transceiver according to the invention illustrating the connections during the transmitting and copying mode.

Referring now to FIG. 9 of the drawings, there is shown therein in block diagram form the interconnections made between a pair of transceivers 10*a* and 10*b* remotely located from each other to form a data transmission system generally designated by the numeral 9. The transceiver 10*a* on the left of the figure is in the transmitting mode preparing to scan an information bearing document 20 and to convert the information thereon into video signals to be sent via communication lines to the transceiver 10*b* on the right hand side of the figure, which is in the receiving or print-out mode. In reality the connections illustrated are made through an interface in each of the machines and the signals generated thereby are carried therefrom along existing communication lines to the other machine. Each of the transceivers 10*a* and 10*b* of data transmission system 9 are capable of functioning both as a transmitter and receiver, thus information can be sent in either direction merely by changing the mode of operation of the machines.

A detailed explanation of the operation of the transceivers 10*a* and 10*b* according to the invention both in the receiving and transmitting modes will now be given using FIG. 10 which shows in more detail the circuitry of a transceiver 10.

Figure 10:
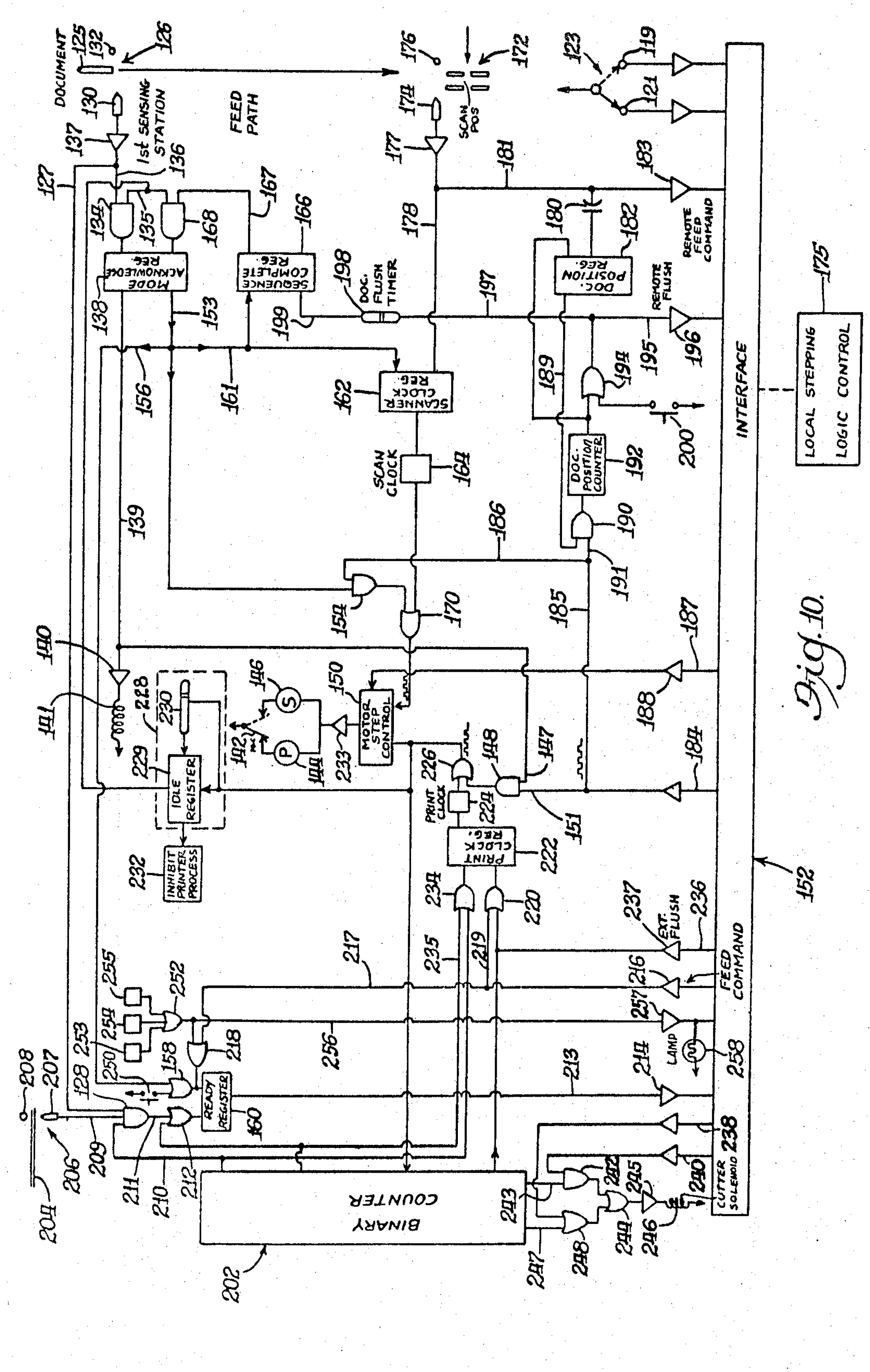
FIG. 10 is a circuit diagram describing in more detail the transmitting and receiving mode portions of the transceiver according to the invention.

Referring now to FIG. 10, the circuitry therein will be used first to illustrate the operation of a transceiver device according to the invention in the transmitting mode, as in the case of transceiver 10*a* of FIG. 9.

TRANSMITTING MODE

The transceiver device 10, when not transmitting or receiving data, is normally in a ready state. Upon insertion of a document into the document scanning station 126 whereat there is located sensing apparatus including a photocell 130 and light source 132, the light from source 132 is prevented from impinging on photocell 130 and the presence of the document is thereby sensed. The blocking of light from photocell 130 by the document causes a signal to be sent through amplifier 137 along lead 127 to disable AND gate 128, which prevents a copy sheet from being processed while the transceiver is in the scan or transmitting mode. Also, AND gate 134, which is preconditioned at input 135 thereof by Idle Register 229, receives via input 136 and amplifier 137, a pulse to in turn set the Mode Acknowledgment Register, indicated by block 138, to a scan mode. It should be noted that the last-mentioned register 138 is normally held in a print mode until a document 125 has been detected at sensing station 126.

The placing of Register 138 in a scan mode or position causes relay 141 to be operated via a pulse sent over output 139 and through amplifier 140. The operation of relay 141 moves its armature 142 from its normal position, connected to the print motor 144, to connect with the scan motor 146. The signal via output 139 also serves, via input lead 147, to condition gate 148 and thereby to inhibit external step pulses from the remote receiving unit from affecting the Motor Step Control 150 via input lead 184 from Interface 152.

A signal placed on the other output lead 153 of Register 138, is used to partially enable AND gate 154. In addition a signal sent via lead 156 to OR gate 158 serves to reset the Ready Register 160 to a busy condition to prevent the breaking in on the communications line over which the data is to be sent while the document 125 is being scanned. Furthermore, the signal on output 153 is sent along lead 161, to set the Scanner Clock Register 162 so that the Scan Clock 164 can now Control the Stepping Motor Control 150, and also to reset the Sequence Complete Register 166 which in turn, via output lead 167, conditions AND gate 168 so that the next time an idle condition occurs (usually after the scanning of document 125) the Mode Acknowledgment Register 138, will be reset back to a print mode.

At this time, the Scan Clock 164 is running and controlling the Motor Step Control 150 through OR gate 170.

The Scan Clock 164 provides as many signals as are necessary to move the document 125 up to a second sensing station 172 in transceiver 10. The second sensing station 172, like station 126, also includes a photocell 174 and light source 176. The second sensing station 172 is located approximately 1.25 inches ahead of the slit 82 of scanning light tube 22 (FIG. 5).

When the document 125 breaks the light from source 176 to photocell 174, the Motor Step Control 150 is turned over to the Local Stepping Logic Control 175 incorporated in the transceiver. The Local Stepping Logic Control 175, shown herein in block diagram form comprises logic circuitry which controls the scanning of the document in accordance with the type of information, (i.e., pattern of light and shadow) formed on the document. That is, the logic circuitry detects the form of coded data and operates the stepping control accordingly. For a more detailed explanation of such logic circuitry, see U.S. Pat. No. 3,394,352, issued July 23, 1968. The Scanner Clock Register 162 is reset via a signal through amplifier 177 and over lead 178, and capacitor 180 is charged up over lead 181. The charging of the capacitor conditions Document Position Register 182 until the trailing edge of document 125 passes the second scanning station 172. This will be explained in greater detail hereinafter. In addition to the above, a motor command signal is sent through Remote Feed Command Amplifier 183 into Interface 152 and on to the Local Stepping Logic Control 175 to inform the latter that it now controls the scan Stepping Motor 146.

Scanning Stepping Motor 146 at this time is controlled by Control 175 via signals through interface 152 and the external motor step line 184, leads 185, 186, and through AND gate 154 which was previously conditioned by the output 153 of the Mode Acknowledgment Register 138. The stepping signals through AND gate 154 go through OR gate 170 into the Motor Step Control 150 to operate Scanning Stepping Motor 146.

Initially signals from the Local Stepping Logic Control 175 cause a prescanning of document 125. In other words, the document is moved approximately 2 inches past the scanning slot 82. The Stepping Motor 146 is then reversed to retract the document to scanning station 172. The reversal of motor 146 is controlled by signals sent via motor direction control lead 187 and amplifier 188.

The prescanning of the document requires only about two seconds and allows the Logic Control 175 to determine the density range between the darkest and lightest areas of information on the document. This permits circuitry therein to adjust to dark backgrounds such as documents printed on grey paper, and differentiate between information and background.

When the prescanning takes place at the transceiver 10, the remote printer unit also is permitted time to move copy paper into position for transporting the latter through the copy cycle.

After the prescanning of document 125 is completed and copy paper has been positioned at the remote printing unit, the document is stepped in accordance with signals from the Logic Control 175. The document, while being stepped is scanned by a light beam created by the impinging of electron beam 71 on the phosphor face portion of CRT 12 (FIG. 1) and the reflected light from the surface of document 125 is collected in tube 22 and converted to data signals which are sent to the remote printing unit in the manner heretofore described.

At the end of the scanning cycle, as the trailing edge of the document 125 passes second sensing station 172, capacitor 180 which was charged up as described heretofore discharges into Document Position Register 182 setting the last-mentioned Register. The Document Position Register via lead 189 enables AND gate 190 which is preconditioned by motor step pulses at input 191 thereof from the remote print unit. The motor stepping pulses now coming in on input 191 are also received by Document Position Counter 192.

As mentioned heretofore, the second scanning station 172 is located approximately 1.25 inches ahead of scanning slot 82 (FIG. 5) so that the Document Position Counter 192 is necessary to indicate that the trailing edge of document 125 has passed the scanning slot. The Document Position Counter 192 counts a predetermined number of pulses and at the end thereof, the trailing edge of the document should be past scanning slot 82. Furthermore, when the predetermined number of counts is completed, Document Position Counter 192 operates OR gate 194 which serves to transfer the pulse signals through a Remote Flush line 195 and amplifier 196 to interface 152 and back to the remote printer unit. The pulse signals likewise, via lead 197 start the Document Flush Timer 198 which allows the scanner clock to run a long enough time to clear the document 125 out of the transceiver 10 and into receiver tray 34 (FIG. 1).

When the document has been scanned, the Sequence Complete Register 166 is reset via lead 199. Thus, the next time an idle condition occurs, AND gate 134 and AND gate 168 will be activated to cause the Mode Acknowledgement Register to be reset to a normal condition so that transceiver 10 will return to a print mode.

In the event, while scanning a document, such as 125, it is desired to stop scanning and to remove the document from the transceiver, a manual control switch 200 connected to OR gate 194 may be operated. The operation of switch 200 causes an immediate "flushing" of the document from the transceiver. Furthermore, in the same manner as explained above, this copy being made at the remote printing unit is likewise caused to be "flushed" from the printer via signals over the remote flush lead 195 and interface 152.

The above description covers the operation of the transceiver device according to the invention in the transmitting mode. However, as described heretofore, the transceiver device is also capable of receiving information via communication lines and making hard copies thereof. A description of the operation of the transceiver 10 in the receiving mode is as follows:

RECEIVING MODE

Three conditions must be met before the transceiver 10 is placed into a receiving mode, as in the case of the transceiver 10*b* of FIG. 9. The conditions are:

1. the binary counter 202 must be at a start setting;

2. copy paper 204 must be at a start position in the machine; and 3. the transceiver must not be in the transmitting mode (scanning a document).

The Binary Counter 202 always is at a start setting provided a copy sheet is not being processed in the transceiver. In the event copy paper is not at the start position copy paper sensing station 206 will indicate this condition, and, as explained heretofore, if a document is being scanned, sensing station 126 will indicate this condition.

The sensing station 206, like the document sensing stations, comprises a photocell 207 and a light source 208 disposed on opposite sides of the copy sheet path.

The copy paper path sensing station 206 including light source 208 and photocell 207, as explained, serves to detect a copy sheet 204 at its start position therebetween. If a copy sheet, such as 204, is not at the start position, a not-start signal via lead 209 disables AND gate 128. If copy paper is being processed, a not-ready signal provided by Binary Counter 202 along conductor 210 likewise will disable AND gate 128.

Thus, from the above, it can be seen that when a copy paper is at sensing station 206, breaking the light beam between the light source and photocell, a document is not being scanned, and a copy sheet is not being processed, AND gate 128 is fully enabled. The enabling of AND gate 128 serves to enable OR gate 212 connected at the output 211 of AND gate 128. This, in turn, sets the Ready Register 160, which provides a first ready signal via amplifier 214 connected thereto by conductor 213 to Interface 152.

The first ready signal at the interface indicates to the remote feed unit which is in the transmitting mode, that the machine is in a ready condition to receive data signals.

The remote Local Stepping Logic Control now provides a feed command signal to the Interface 152. The feed command signal is received via amplifier 216 and serves to enable OR gate 218 along lead 217, and OR gate 220 via lead 219. OR gate 218, when enabled resets the Ready Register 160 so that a busy signal is provided and OR gate 220 sets the Print Clock Register 222 to turn on the Print Clock 224.

Once operated, the Print Clock 224 provides a predetermined number of advance signals. Each signal enables OR gate 226 and each time OR gate 226 is enabled, Motor Step Control 150 is activated, the Idle Register Time Unit 228, comprising Idle Register 229 and Timer 230, is set and the Binary Counter 202 is stepped.

With the Idle Register Timer Unit 228 set, the corona charging unit, developer assembly, fuser and other copy processing instrumentalities (not shown in FIG. 10) are operated. Each advance signal serves to maintain the copy processing instrumentalities operation and to prevent the operation of the inhibit Printer Processing Unit 232 connected to the Idle Register Timer Unit. In the event the last-mentioned Timer Unit does not receive an advance signal, after a predetermined time, the Idle Register 229 will cause the Inhibit Printer Processer 232 to prevent the further operation of the copying instrumentalities.

With each advance signal the Motor Step Control via amplifier 233 operates copy paper Transport Motor 144. It should be noted that in the receiving mode, relay 141 is not operative and therefore the contact armature 142 thereof remains in its normal condition, connecting up copy paper Transport Motor 144.

The operation of Motor 144 steps the copy paper a predetermined distance along the copy feed path. The Print Clock provides only a sufficient amount of advance signals to move the leading edge of the copy paper past the copy processing instrumentalities to CRT 12 (FIG. 1). The advance signals are counted by the Binary Counter 202 and the latter provides a second ready signal with the arrival of the copy paper at CRT 12. The ready signal enables OR gate 212 and OR gate 234 along lead 235.

With OR gate 212 fully enabled, the second ready signal is transmitted to the Interface 152 via lead 213 to inform the remote transmitting unit that copy paper is in position at CRT 12. With OR gate 234 enabled, the Print Clock Register 222 is reset, turning over the control of the movement of the copy paper 204, to the Local Stepping Logic Control of the remote transmitting unit.

The remote unit (not shown) through its Logic Control now sends advance signals over the external motor step line 184. Each advance signal enables AND gate 148. These signals transferred via OR gate 226 enable the Motor Step Control 150 to continue the feeding of copy paper through the machine.

After the original document of the transmitting unit has been scanned, and the copy paper has been exposed at the CRT position, a signal is provided to the Interface 152 and external flush lead 236, through amplifier 237 to OR gate 220. With this signal, the movement of the copy paper is returned to the receiving unit. The receiving unit then moves the copy paper past the developer 52 and through the fuser 56 (FIG. 1) and out of the machine.

In the event the original document being scanned in the remote unit is longer than usual, and cannot be handled by the machine, the counter is preset to provide an internal flush signal to return the control of movement of the copy paper to the machine.

It should be noted that when beginning a transmission of data, the operator of the remote unit selects the size of the copy paper in accordance with the document to be scanned. The selection, as mentioned heretofore, is made by the length selector 123 which in the example shown has two settings, a 14-inch length setting 121, and an 8½-inch length setting 119.

Depending upon the selection a cut-off signal comes over either line 238 or 240. If a 14-inch length is selected, a signal is received over line 240 to partially enable AND gate 242. When the Binary Counter 202 has counted the number of advance signals corresponding to a 14 -inch length of copy paper, AND gate 242 receives a second signal via lead 243 and is fully enabled to activate the cutting solenoid 246 through OR gate 244 and amplifier 245. Likewise if the 8 ½-inch length is chosen, AND gate 248 is partially enabled and is fully enabled with a signal from Counter 202 over lead 247 subsequent to a counting by the Counter 202 of the predetermined number of advance signals required for an 8 ½-inch length of paper.

It should be understood that if the transceiver device is off-line for some reason such as, for example, the reloading of paper, etc., the operator presses off-line button 250. This enables OR gate 158 and a busy signal is placed on the line by Ready Register 160. If the machine is out of paper or a jam occurs in the transport system, OR gate 252 is enabled by a signal from one of the malfunction indicators 253, 254 or 255, (three indicators are shown for the purpose of illustration only). The enabling of OR gate 252 provides a malfunction signal to the remote unit via lead 256 and amplifier 257, and provides a visual indication of the malfunction at the receiving station via lamp 258. The malfunction signal also enables OR gate 218 which also resets the Ready Register to indicate that the machine is in a busy condition.

Thus, the transceiver device according to the invention provides a unit which is capable of functioning both as a receiving, hard copy print-out machine and a transmitting, document scanning machine. The transceiver, using only the light of a single cathode ray tube is able to both scan an original document, and through the use of a unique light collecting tube, is able to convert the reflected light rays into data signals which are transmitted via existing telephone or the like communication line to another transceiver device serving as a receiver. The signals are received by the receiver in a similar cathode ray tube and converted back to information which is used to image a copy sheet, passing along the face of the tube, whereby a hard copy of the transmitted data is created.

While particular embodiments of the transceiver device according to the invention has been shown and described, it should be understood that the invention is not limited thereto since many modifications may be made. It is therefore contemplated to cover by the present application any and all such modifications as fall within the true spirit and scope of the appended claims.

What is claimed is:

1. In a transceiver device for transmitting data signals corresponding to data on the surface of a document to a remote receiver, an elongated light collecting tube having a pair of aligned slit openings extending laterally along and spaced 180° from each other about said tube, a reflective interior surface, and an open end, means for moving a document along the outer wall of said tube opposite a first one of said slits and transverse to both the first slit and the direction of elongation of the tube, means for projecting a scanning beam of light through the first and second ones of the slit openings onto the data bearing surface of said document, so that a pattern of light and shadow is reflected from the document back through said first slit opening into said tube, and light responsive means mounted in the open end of said tube for receiving said reflected pattern and in response thereto producing data signals transmittable to said remote source.

2. A transceiver device as claimed in claim 1 further including a fiber optic bundle interposed between said first slit and said document, said fiber optic bundle channeling light reflected from the surface of said document into the interior of said light collecting tube.

3. A transceiver device operable to a transmitting mode for sending to a remote receiver data signals corresponding to information recorded on a document, and to a receiving mode for receiving data signals from a remote source, converting the signals into visible information and producing a hard copy thereof, said transceiver device including:

document transport means for moving a document fed into said transceiver device along a predetermined feed path;

document scanning means located along said path;

first and second document sensing means located in spaced apart relation along said path ahead of said scanning means;

means responsive to the sensing of said document at said first sensing means for causing said document transport means to move said document to said second sensing means; and, logic control means causing said transport means to move said document past said scanning means a predetermined distance for prescanning a portion of said document and to return said document to said second sensing means prior to said transport moving said document entirely past said scanning means, whereby said information recorded on said document is transmitted to a remote receiving station.

4. A transceiver device as claimed in claim 3 wherein said document scanning means includes a light source for illuminating said document, a light collecting means for collecting light reflected from the information bearing surface of said document and means for converting said reflected light into transmittable signals.

5. A transceiver device as claimed in claim 4 wherein said light source includes a cathode ray tube having a face portion along which a scanning electron beam is projected to illuminate said document.

6. A transceiver device operable to a transmitting mode for sending to a remote receiver data signals corresponding to information recorded on a document, and to a receiving mode for receiving data signals from a remote source, converting the signals into visible information and producing a hard copy thereof, said transceiver device including:

document transport means for moving a document fed into said transceiver device along a predetermined feed path;

document scanning means located along said path;

first and second document sensing means located in spaced apart relation along said path ahead of said scanning means;

means responsive to the sensing of said document at said first sensing means for causing said document transport means to move said document to said second sensing means;

signal blocking means responsive to the sensing of said document at said first sensing means to block incoming data signals from said transceiver device during the transmitting mode; and logic control means for controlling the movement of said document past said document scanning means in response to said document being sensed by said second sensing means, said logic control means causing said document transport means to move said document past said scanning means, whereby said information recorded on said document is transmitted to a remote receiving station.

7. A transceiver device operable to a transmitting mode for sending to a remote receiver data signals corresponding to information recorded on a document, and to a receiving mode for receiving data signals from a remote source, converting the signals into visible information and producing a hard copy thereof, said transceiver device including:

document transport means for moving a document fed into said transceiver device along a predetermined feed path;

document scanning means located along said path;

said document scanning means including a light source for illuminating said document, light collecting means comprising an elongated tubular member having a reflective inner surface, an opening therein and first and second aligned slits extending along the wall of the member and spaced from each other 180° thereabout, for receiving light reflected from the surface of said document, and light converting means including photosensitive means mounted in said opening in said tubular member for receiving light reflected along the inner surface of said member and converting said light into transmittable data signals;

first and second document sensing means located in spaced apart relation along said path ahead of said scanning means;

means responsive to the sensing of said document at said first sensing means for causing said document transport means to move said document to said sensing means; and logic control means for controlling the movement of said document past said document scanning means in response to said document being sensed by said second sensing means, said logic control means causing said document transport means to move said document past said scanning means, whereby said information recorded on said document is transmitted to a remote receiving station.

8. A transceiver device as claimed in claim 7 wherein said photosensitive means includes a photomultiplier.

9. A data transmission system comprising a transceiver device operable to a transmitting mode for sending data signals corresponding to information recorded on a data bearing document, to a remote receiver and to a receiving mode for receiving data signals from a remote transmitter, converting the signals into visible information and producing a hard copy thereof, said transceiver device including:

a supply of copy material;

charging, exposing, developing and fusing stations arranged along a copy path and each including appropriate copy processing instrumentalities;

transport means for transporting said copy material along said copy path past said stations;

means responsive to signals from said remote transmitter to operate the copy processing instrumentalities and to operate said transport means to move said copy material a predetermined distance past said charging station toward said exposing station;

means for signaling said remote transmitter upon said copy material being positioned at a predetermined location along said path in a ready position for imaging means included in said remote transmitter, and responsive to signals from said last-mentioned signaling means for controlling the movement of said copy material through said exposing station;

means for controlling said transport means to move said copy material past said developing and fusing stations subsequent to the movement of said copy material by signals from said remote transmitter means.

10. A transceiver device connectable to a remote transmitter and operable to a receiving mode for receiving data signals from said transmitter, converting the signals into visible information and producing a hard copy thereof, said transceiver device comprising the usual copy processing instrumentalities including charging, exposing, developing and fusing stations disposed along a copy path;

a supply of copy material;

transport means for moving said copy material along said copy path;

means responsive to first signals received from said transmitter to operate said copying instrumentalities and to operate said transport means to move said copy material past said charging station towards said exposing station;

means for indicating to said remote transmitter the arrival of said copy material at said exposing station to cause said remote transmitter to assume control of the movement of said copy material through said exposing station in accordance with signals transmitted therefrom; and means for controlling said transport means to move said copy material past said developing and fusing stations subsequent to the movement of said copy material past said exposing station.

11. In a transceiver device for transmitting data signals corresponding to data on the surface of a document to a remote receiver, an illumination source comprising a cathode ray tube providing a scanning light beam for scanning the data bearing surface of said document;

optical means for directing said scanning light beam from said source to the data bearing surface of said document;

means for collecting light reflected from said document as said scanning light beam traverses the data bearing surface of said document, said light collecting means comprising a hollow and elongated tubular member having a reflective interior surface and slit extending along the wall of said tubular member through which light reflected from said document surface passes into the interior of said tubular member, said tubular member including a second slit extending along the wall therof spaced from said first-mentioned slit 180° about said tubular member, said scanning light beam passing through both said slits to illuminate the data bearing surface of said document; and photosensitive means mounted in said light collecting tubular member for receiving light collected in said tubular member and for converting said light rays as they are received into transmittable data signals.

12. A transceiver device as claimed in claim 5 wherein at one end of said tubular member there is provided a mirrored surface facing the interior of the tubular member and wherein at the opposite end of the tubular member there is provided a photomultiplier for receiving light reflected from within the tubular member, and converting said light as it is received into transmittable data signals.

13. A transceiver device as claimed in claim 5 further including a video signal generator connected to said photomultiplier and having gain control means for increasing the amplitude of weaker signals produced by said photomultiplier.

14. A copy transceiver unit for making copies of originals on copy material in response to received electrical signals and producing electrical signals representing originals to be transmitted comprising a copy making assembly for making a copy on copy material and including first drive means for moving copy material along a path through the copy making assembly, an original scanning assembly for providing electrical signals representing an original to be copied, said original scanning assembly including second drive means for moving an original along a path through the original scanning assembly, one single controllable source of radiation forming a part of both said copy making assembly and said original scanning assembly and operable according to two different modes of operation, a mode control operable to a first setting to render said first drive means effective, to inhibit said second drive means, and to operate said single controllable source in a first mode such that it is responsive to control by received electrical signals to make a copy on the copy material advanced along its path by said first drive means, said mode control also being operable to a second setting to render said second drive means effective to move an original along its path, to inhibit the first drive means, and to operate the single controllable source in a second mode such that it illuminates the original as it moves along the path, sensing means disposed adjacent the path of movement of the copy material and responsive to the copy material in it path, and means controlled by the sensing means for enabling operation of the receiving mode of the transceiver unit with the mode control in said first setting.

15. The copy transceiver unit set forth in claim 14 including first and second optical means for coupling the controllable source to the copy making and original scanning assemblies, said first and second optical means including a portion common to both of said first and second optical means.

16. A copy transceiver unit for making copies of originals on copy material in response to received electrical signals and producing electrical signals representing originals to be transmitted comprising a copy making assembly for making a copy on copy material and including first drive means for moving copy material along a path through the copy making assembly, an original scanning assembly for providing electrical signals representing an original to be copied, said original scanning assembly including second drive means for moving an original along a path through the original scanning assembly, one single controllable source of radiation forming a part of both said copy making assembly and said original scanning assembly and operable according to two different modes of operation, a mode control operable to a first setting to render said first drive means effective, to inhibit said second drive means, and to operate said single controllable source in a first mode such that it is responsive to control by received electrical signals to make a copy on the copy material advanced along its path by said first drive means, said mode control also being operable to a second setting to render said second drive means effective to move an original along its path, to inhibit the first drive means, and to operate the single controllable source in a second mode such that it illuminates the original as it moves along the path, sensing means disposed adjacent and responsive to an original in the path of movement of the original, and means controlled by the sensing means for inhibiting operation of the receiving mode of the transceiver unit with the mode control in said first setting.

17. A copy transceiver unit for making copies of originals on copy material in response to received electrical signals and producing electrical signals representing originals to be transmitted comprising a copy making assembly for making a copy on copy material and including first drive means for moving copy material along a path through the copy making assembly, an original scanning assembly for providing electrical signals representing an original to be copied, said original scanning assembly including second drive means for moving an original along a path through the original scanning assembly, one single controllable source of radiation forming a part of both said copy making assembly and said original scanning assembly and operable according to two different modes of operation, a mode control operable to a first setting to render said first drive means effective, to inhibit said second drive means, and to operate said single controllable source in a first mode such that it is responsive to control by received electrical signals to make a copy on the copy material advanced along its path by said first drive means, said mode control also being operable to a second setting to render said second drive means effective to move an original along its path, to inhibit the first drive means, and to operate the single controllable source in a second mode such that it illuminates the original as it moves along the path, and sensing means disposed adjacent and responsive to an original in the path of movement of the original for enabling operation of the transmitting mode of the transceiver with the mode control in it second setting.

* * * * *